(12) United States Patent
Arai et al.

(10) Patent No.: US 10,859,846 B2
(45) Date of Patent: Dec. 8, 2020

(54) OPTICAL UNIT WITH SHAKE CORRECTION FUNCTION

(71) Applicant: NIDEC SANKYO CORPORATION, Nagano (JP)

(72) Inventors: Tsutomu Arai, Nagano (JP); Takeshi Sue, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 104 days.

(21) Appl. No.: 16/183,755

(22) Filed: Nov. 8, 2018

(65) Prior Publication Data

US 2019/0137780 A1    May 9, 2019

(30) Foreign Application Priority Data

Nov. 8, 2017    (JP) .................................. 2017-215448

(51) Int. Cl.
*G02B 27/64*    (2006.01)
*H04N 5/225*    (2006.01)
(Continued)

(52) U.S. Cl.
CPC ............. *G02B 27/646* (2013.01); *G02B 7/08* (2013.01); *H04N 5/2254* (2013.01);
(Continued)

(58) Field of Classification Search
CPC ...... G02B 27/646; G02B 7/08; H04N 5/2254; H04N 5/23264; H04N 5/23287; G03B 2205/0007; G03B 2205/0069
See application file for complete search history.

(56) References Cited

U.S. PATENT DOCUMENTS

| 8,842,355 B2 | 9/2014 | Lipton | |
| 2010/0091120 A1* | 4/2010 | Nagata | H04N 5/23287 348/208.4 |
| 2015/0293372 A1* | 10/2015 | Hamada | H04N 5/2254 359/557 |

FOREIGN PATENT DOCUMENTS

| CN | 101726851 | 6/2010 |
| CN | 102016709 | 4/2014 |

(Continued)

OTHER PUBLICATIONS

Office Action of Taiwan Counterpart Application, with English translation thereof, dated Aug. 6, 2019, pp. 1-7.
(Continued)

*Primary Examiner* — Robert E. Tallman
(74) *Attorney, Agent, or Firm* — JCIPRNET

(57) ABSTRACT

The disclosure reduces the size of an optical unit with a shake correction function provided with a filter switching function and reduces the power consumption. An optical unit with a shake correction function includes a fixed body; a movable body having an optical element; an oscillation support mechanism configured to oscillatably support the movable body with respect to the fixed body; and a shake correction drive mechanism configured to oscillate the movable body, such that the movable body includes a filter and a filter switching mechanism configured to switch the presence or absence of the filter, and the oscillation support mechanism is arranged at a position overlapping the shake correction drive mechanism when seen from a direction perpendicular to a direction of an optical axis of the optical element, and the filter and the filter switching mechanism are arranged at a subject side of the optical element.

10 Claims, 8 Drawing Sheets

(51) Int. Cl.
H04N 5/232 (2006.01)
G02B 7/08 (2006.01)

(52) U.S. Cl.
CPC . *H04N 5/23264* (2013.01); *G03B 2205/0007* (2013.01); *G03B 2205/0069* (2013.01)

(56) References Cited

FOREIGN PATENT DOCUMENTS

| | | |
|---|---|---|
| CN | 103135312 | 8/2016 |
| JP | 2012242463 | 12/2012 |
| JP | 2014006522 | 1/2014 |
| TW | 201518851 | 5/2015 |
| WO | 2016084523 | 6/2016 |

OTHER PUBLICATIONS

"Office Action of China Counterpart Application", dated Aug. 31, 2020, with English translation thereof, pp. 1-12.

\* cited by examiner

OPTICAL UNIT WITH SHAKE CORRECTION FUNCTION

CROSS REFERENCE TO RELATED APPLICATION

The present invention claims priority under 35 U.S.C. § 119 to Japanese Application No. 2017-215448 filed on Nov. 8, 2017, the entire content of which is incorporated herein by reference.

BACKGROUND

Field of the Invention

The present invention relates to an optical unit with a shake correction function for performing shake correction of an optical module mounted on a camera-equipped mobile terminal or the like.

Description of the Related Documents

In an optical unit configured to capture images used in an optical device such as an imaging apparatus mounted on a mobile terminal, a drive recorder, an unmanned helicopter, or the like, to suppress the disturbance in the captured image due to shake, a function has been developed to correct the shake by moving the optical module to cancel the shake. In the shake correction function, a configuration is adopted in which an optical module (a movable body) including an optical element is movably supported with respect to a fixed body formed by a chassis of an optical device, and the optical module is shaken in accordance with a shake by a shake correction drive mechanism. For example, Patent Literature 1 discloses a configuration in which an optical module is oscillatably supported by a gimbal mechanism.

In addition, in a general optical unit configured to capture images, an infrared cut filter is provided so that infrared rays do not enter an imaging unit, but in an optical unit for day and night photography used in applications such as monitoring cameras, etc., to enable capturing clear images at not only bright places but also dark places, it is possible to arrange an infrared cut filter switching mechanism in the light path reaching the imaging unit, when necessary, and thus switch the presence or absence of the infrared cut filter. For example, Patent Literature 2 describes that a dummy filter and an infrared cut filter are mounted on two mounting plates, and the two filters are switched by mutually sliding the two mounting plates.

PATENT LITERATURE

[Patent Literature 1]
Japanese Patent Application Publication No. 2014-6522
[Patent Literature 2]
Japanese Patent Application Publication No. 2012-242463

SUMMARY

As described above, the optical module is required to have various functions depending on the application, but a reduction in size of the optical module itself is also required, and incorporating each mechanism is not easy. In particular, in an optical unit with a shake correction function movably supporting an optical module, arranging a filter switching device in the optical path increases the weight of the optical module itself, making movement control difficult, and also making adjustment of the weight balance difficult, due to which incorporation of the filter switching device has become even more difficult. Further, as the weight of the optical module increases, the power consumption of the optical unit generated along with the shake correction also increases.

The present invention has been achieved in view of the above circumstances, and reduces the size of an optical unit with a shake correction function provided with a filter switching function, and also reduces power consumption.

An optical unit with a shake correction function according to the present invention includes a fixed body; a movable body having an optical element; an oscillation support mechanism configured to oscillatably support the movable body with respect to the fixed body; and a shake correction drive mechanism configured to oscillate the movable body, such that the movable body includes a filter and a filter switching mechanism configured to switch the presence or absence of the filter, and the oscillation support mechanism is arranged at a position overlapping the shake correction drive mechanism when seen from a direction perpendicular to a direction of an optical axis of the optical element, and the filter and the filter switching mechanism are arranged at a subject side of the optical element.

Since the present optical unit with a shake correction function has a filter switching mechanism configured to switch the presence or absence of a filter, it is possible to capture a desired image by selecting the presence or absence of the filter, while having an effect of shake correction. Further, if the position of the center of gravity of the movable body excluding the filter switching mechanism is closer to the imaging unit than the oscillation center position (oscillation fulcrum) of the movable body, the position of the center of gravity of the movable body can be set either to the same position as the oscillation center position, or closer to the oscillation center position by using the filter switching mechanism, and therefore, it is possible to configure the movable body without using a separate member for adjusting the center of gravity. Therefore, an increase in the weight of the movable body can be suppressed, and the torque required for oscillation can be suppressed, due to which the power consumption during the oscillation of the movable body can be reduced. It is noted that in a configuration in which a filter and a filter switching mechanism are arranged between an imaging unit and an optical element, a large space is required between the imaging unit and the optical element in a direction of an optical axis to arrange the filter switching mechanism and the like, which increases the total length of the movable body in the direction of the optical axis. Further, for example, if the position of the center of gravity of the movable body excluding the filter switching mechanism is at the same position as the oscillation center position of the movable body, then by arranging the filter switching mechanism between the imaging unit and the optical element, the position of the center of gravity of the movable body moves to the imaging unit side. In this case, to return the moved position of the center of gravity to the oscillation center position of the movable body, it is necessary to arrange a member for adjusting the center of gravity closer to a subject than the oscillation center position. As a result, the movable body does not simply increase by as much as the space between the filter and the filter switching mechanism, but becomes excessively large by as much as the arrangement of the member for adjusting the center of gravity. For this reason, in a configuration in which a filter and a filter switching mechanism are arranged between an imaging unit and an optical element, the movable body becomes large and the weight of the movable body increases, so that the torque required for oscillation increases, and the power consumption during the oscillation of the movable body increases. In comparison, in the optical unit with a shake correction function according to the present invention, because a filter and a filter switching mechanism are arranged at the subject side of an optical element, the size of the movable body can be made small. Therefore, it is possible to reduce the power consumption during the oscillation of the movable body, and at the same time, the size of the optical unit can be reduced.

In a preferred embodiment of the optical unit with a shake correction function according to the present invention, the filter and the filter switching mechanism may be arranged at a side opposite to the imaging unit side of the optical element with respect to the oscillation center position of the movable body.

Since the position of the center of gravity of the movable body and the oscillation center position of the movable body can be set either to the same position or brought closer to each other, the torque required for the oscillation of the movable body can be reduced. Therefore, the power consumption during the oscillation of the movable body can be reduced.

In a preferred embodiment of the optical unit with a shake correction function according to the present invention, the shake correction drive mechanism is a magnetic drive mechanism having a magnet and a coil for applying an electromagnetic force in a magnetic field of the magnet, the magnet is arranged in the fixed body, and the coil is arranged in the movable body.

By arranging a magnet on a fixed body and arranging a coil lighter in weight than the magnet on the movable body, the weight of the movable body can be reduced as compared with the case where the coil is arranged on the fixed body and the magnet is arranged on the movable body. Therefore, since the torque required for the oscillation of the movable body can be reduced, it is possible to further reduce the power consumption during oscillation.

In a preferred embodiment of the optical unit with a shake correction function according to the present invention, the movable body may include a flexible wiring board connected to the shake correction drive mechanism, the imaging unit, and the filter switching mechanism.

With one flexible wiring board, it is possible to supply power to the shake correction drive mechanism (coil), supply power to the imaging unit (imaging element), and also supply power to the filter switching mechanism. Therefore, compared to a configuration in which individual flexible wiring boards are connected to each of the shake correction drive mechanism, the imaging unit, and the filter switching mechanism, the occurrence of oscillation resistance torque due to a stress of the flexible wiring board at the time of the oscillation of the movable body can be suppressed. Therefore, the power required during oscillation can be reduced, and thus a reduction in power consumption can be achieved. Further, since the number of flexible wiring boards can be reduced, the manufacturing cost can be reduced.

In a preferred embodiment of the optical unit with a shake correction function according to the present invention, the movable body may include a member for adjusting the position of the center of gravity.

Since the position of the center of gravity of the movable body can be finely adjusted by the member for adjusting the position of the center of gravity, the position of the center of gravity of the movable body can be arranged at the same position as the oscillation center position. Therefore, since the torque required for the oscillation of the movable body can be reduced, it is possible to further reduce the power consumption during oscillation.

In a preferred embodiment of the optical unit with a shake correction function according to the present invention, the filter may be an infrared cut filter.

By enabling the extraction and insertion of the infrared cut filter (IR filter) in an optical path of the optical element, in a case that infrared rays equal to or more than a predetermined amount are made to enter the imaging unit in a bright place, the infrared cut filter can be inserted in the optical path to reduce the entry of the infrared rays, and thus a quantity of light having an appropriate wavelength can be input to the imaging unit. On the other hand, in a dark place, the infrared rays can be made to enter the imaging unit by removing the infrared cut filter from the optical path. Therefore, by switching the presence or absence of the infrared cut filter, it is possible to capture clear images at not only bright places but also dark places, and day and night photography can be performed. It is noted that the filter may be a combination of an infrared cut filter and an anti-reflection filter. Further, in addition to the infrared cutoff filter, various filters such as an anti-reflection filter, an ND filter, a polarization filter, and the like are included in the filter.

According to the present invention, it is possible to reduce the size of the optical unit with a shake correction function provided with a filter switching function, and thus, a reduction in power consumption can be achieved.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an optical unit with a shake correction function according to the present invention will be described with reference to drawings, below. In the following description, three directions perpendicular to one another are each referred to as an X-axis direction, a Y-axis direction, and a Z-axis direction and in a stationary state, it is assumed that an optical axis L (lens optical axis/optical axis of optical element) is placed in the Z-axis direction. Further, among shakes in each of the directions, a rotation around the X-axis corresponds to a so-called pitching (vertical shake), a rotation around the Y-axis corresponds to a so-called yawing (horizontal shake), and a rotation around the Z-axis corresponds to a so-called rolling. Further, one side in the X-axis direction is denoted by +X, while the other side is denoted by −X, one side in the Y-axis direction is denoted by +Y, while the other side is denoted by −Y, and one side in the Z-axis direction (the side of a subject/front side in the optical axis direction) is denoted by +Z, while the other side (the side opposite to the side of a subject/rear side in the optical axis direction) is denoted by −Z for description. Further, in FIG. 1 to FIG. 8, a state in which the +Z side is the one side of the Z-axis that is directed upward is set as the stationary state. Hereinafter, unless stated otherwise, description is given in this stationary state.

Figure 1:
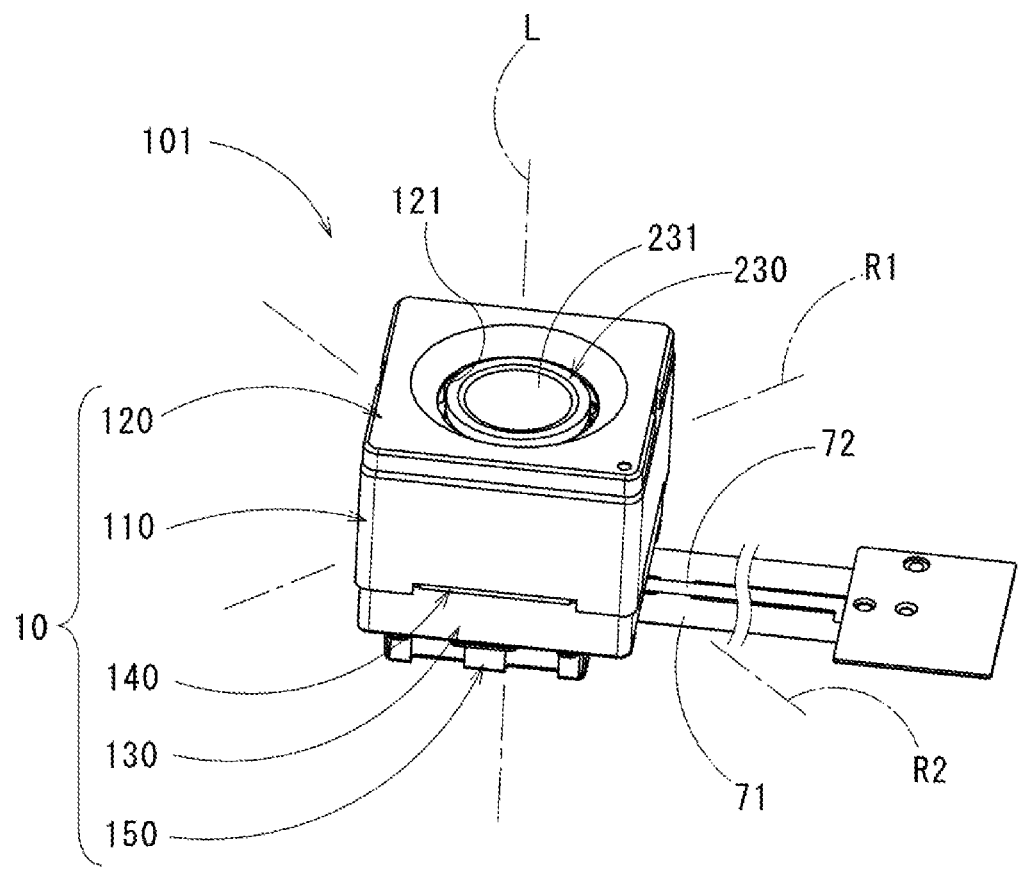
FIG. 1 is an external perspective view of an optical unit with a shake correction function according to a first embodiment of the present invention.
Figure 1:
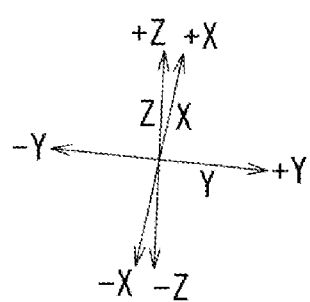
Figure 2:
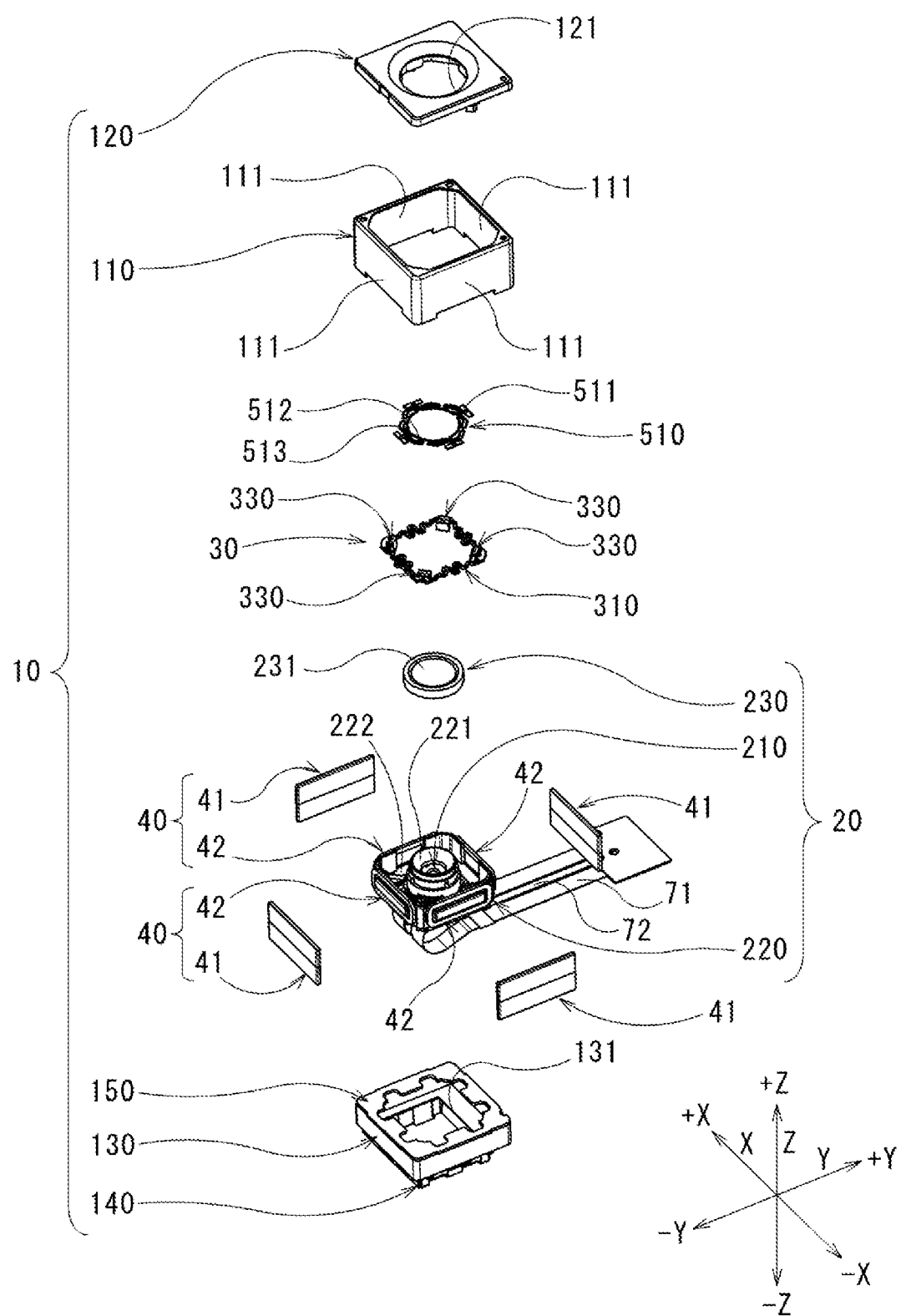
FIG. 2 is an exploded perspective view of the optical unit with a shake correction function according to FIG. 1.
Figure 3:
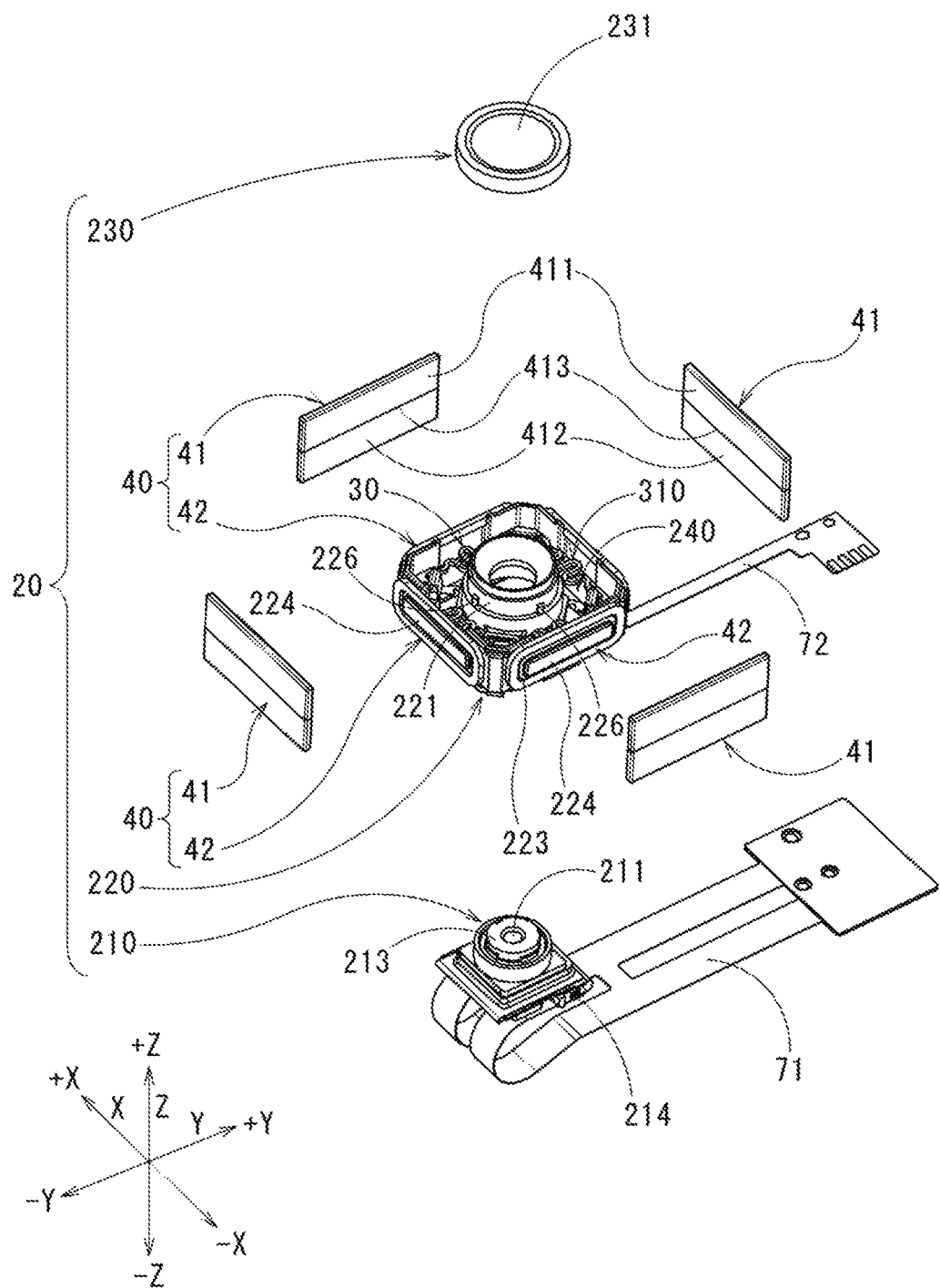
FIG. 3 is an exploded perspective view of a movable body in the optical unit with a shake correction function according to FIG. 1.
Figure 4:
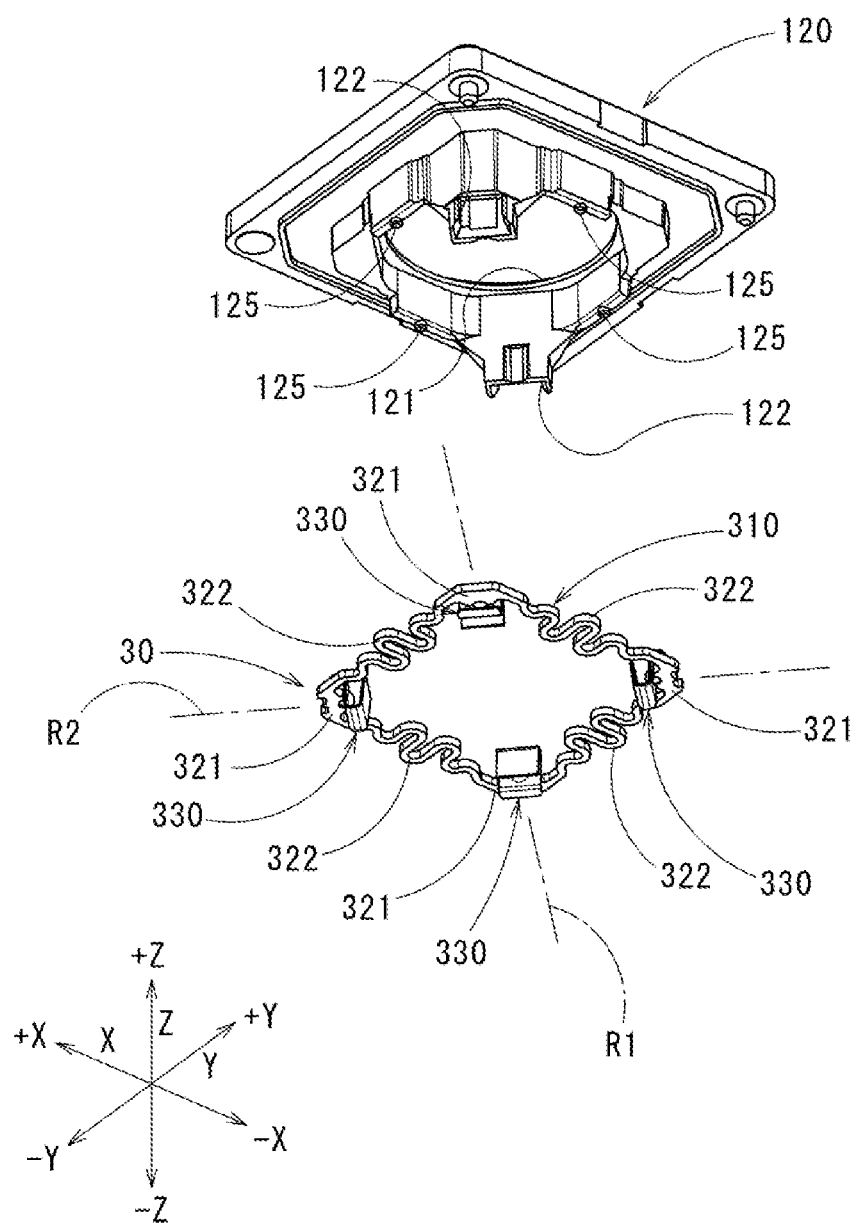
FIG. 4 is a perspective view of a cover frame and a gimbal mechanism in the optical unit with a shake correction function according to FIG. 1 as seen from a –Z side.
Figure 5:
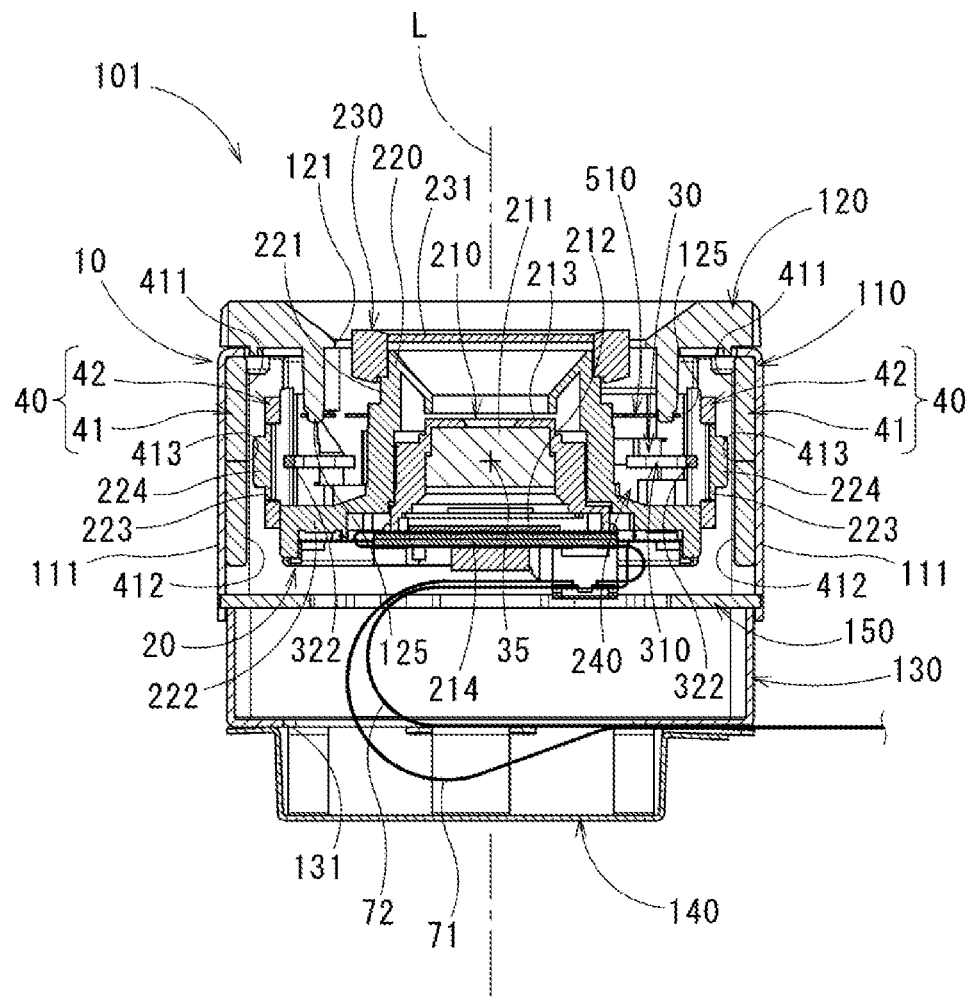
FIG. 5 is a vertical cross-sectional view in a Y-Z plane passing through an optical axis in the optical unit with a shake correction function according to FIG. 1.
Figure 5:
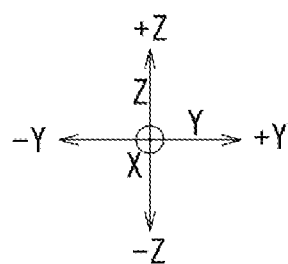
Figure 6:
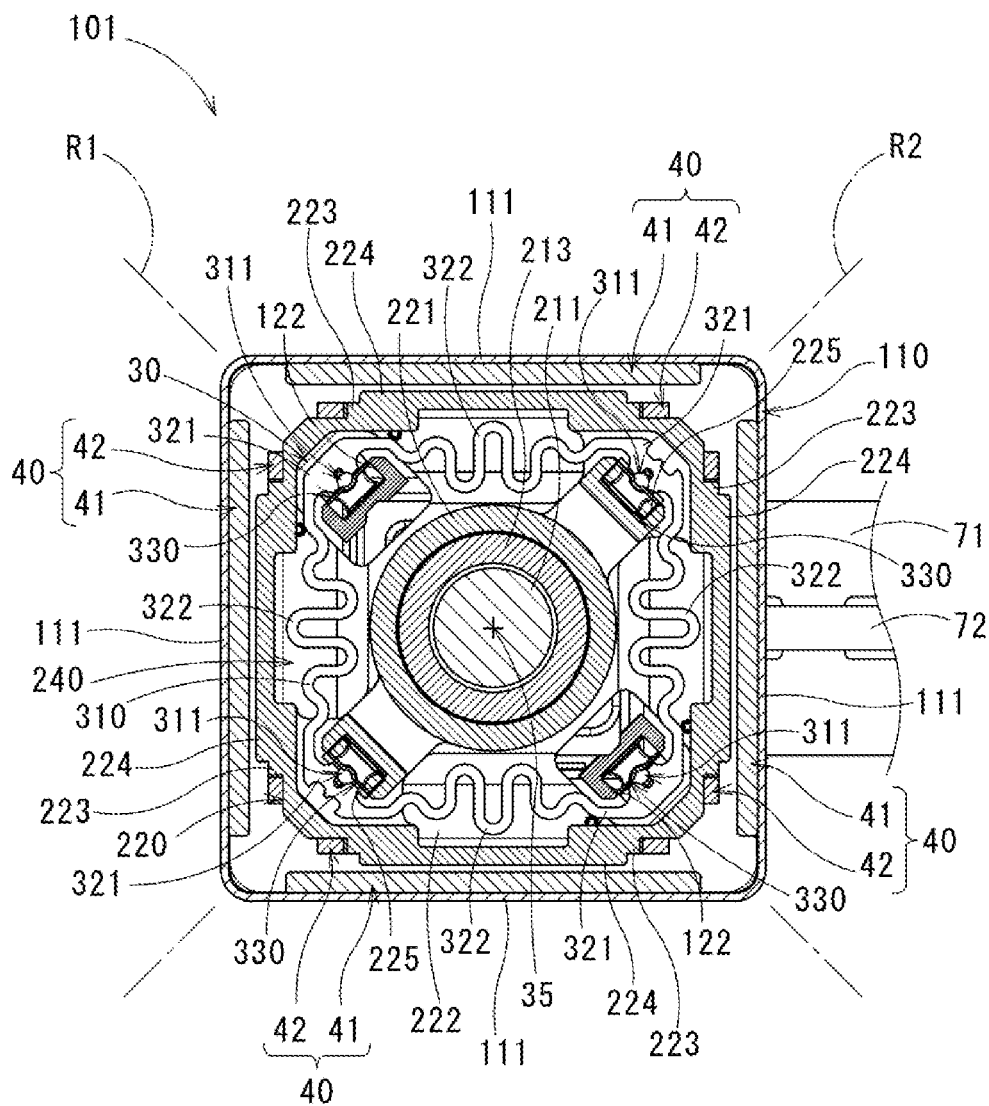
FIG. 6 is a horizontal cross-sectional view in an X-Y plane near the gimbal mechanism and a shake correction drive mechanism in the optical unit with a shake correction function according to FIG. 1.
Figure 6:
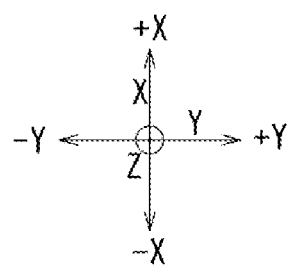

First Embodiment (Schematic Configuration of an Optical Unit 101 with a Shake Correction Function) FIG. 1 is a perspective view of an appearance of an assembled state of an optical unit 101 with a shake correction function (hereinafter abbreviated as an optical unit). FIG. 2 is an exploded perspective view of the optical unit 101 when the optical unit 101 is disassembled along an optical axis L direction. FIG. 3 is an exploded perspective view of a movable body 20, described later, of the optical unit 101. FIG. 4 is a perspective view of a cover frame 120 and a gimbal mechanism (oscillation support mechanism) 30, described later, of the optical unit 101 as seen from a −Z side. FIG. 5 is a vertical cross-sectional view in a Y-Z plane passing through the optical axis L of the optical unit 101. FIG. 6 is a horizontal cross-sectional view in an X-Y plane near the gimbal mechanism 30 and a shake correction drive mechanism 40, described later, of the optical unit 101.

The optical unit 101 illustrated in FIG. 1 is a thin camera incorporated in an optical device (not shown) such as an imaging apparatus mounted on a mobile terminal, a drive recorder, an unmanned helicopter, or the like, and is mounted in a supported state on a chassis (device main body) of the optical device. In such a type of the optical unit 101, when shake such as camera shake occurs in the optical device at the time of capturing images, a disturbance occurs in the captured image. Therefore, in the optical unit 101 according to the present embodiment, the movable body 20 having the optical module (optical element) 210 the optical axis L of which extends along the Z-axis direction is made to oscillate based on a result of detection of a shake by a shake detection sensor (not shown) such as a gyroscope or the like, so that the pitching and yawing can be corrected.

In FIG. 1 to FIG. 6, the optical unit 101 according to the present embodiment includes a fixed body 10, a movable body 20 having an optical module 210, a gimbal mechanism 30 as an oscillation support mechanism in which the movable body 20 is in an oscillatably supported state with respect to the fixed body 10, and a shake correction drive mechanism 40 configure to oscillate the movable body 20. Further, as illustrated in FIG. 2 and FIG. 6, the movable body 20 is oscillatably supported around a first axial line R1 crossing the optical axis L direction via the gimbal mechanism 30 with respect to the fixed body 10, and is also oscillatably supported around a second axial line R2 crossing the optical axis L direction and the direction of the first axial line R1. Thus, in the optical unit 101, by making the movable body 20 oscillate around the two axes (the first axial line R1 and the second axial line R2) that are perpendicular to the optical axis L, the pitching and yawing are corrected.

It is noted that in the optical unit 101 according to the present embodiment, the fixed body 10 has a square shape as seen from the optical axis L direction (+Z direction). Further, as illustrated in FIG. 6, the first axial line R1 and the second axial line R2 are perpendicular to the optical axis L direction. Also, the first axial line R1 and the second axial line R2 are perpendicular to each other, and are arranged at an angle of 45° with respect to the X axis and the Y axis.

(Configuration of Fixed Body 10)

As illustrated in FIG. 2, FIG. 5 and the like, the fixed body 10 has a square tube shaped first case 110 surrounding the periphery of the movable body 20, a cover frame 120 fixed above the first case 110 (one side +Z in the Z-axis direction), and a second case 130 arranged under the first case 110 (the other end side −Z in the Z-axis direction). In the present embodiment, the first case 110 is formed in a rectangular tubular shape by side plate units 111 arranged in four directions. The cover frame 120 is formed in a rectangular frame shape protruding inward in a radial direction from an end on one side +Z in the Z-axis direction of the first case 110. Also, a circular opening window 121 is formed in a center portion of the cover frame 120, and the light from the subject is guided to the optical module 210 through the opening window 121. Further, the second case 130 is formed in a rectangular box shape opening upward, and an opening 131 for drawing, to the outside, flexible wiring boards 71, 72 connected to the optical module 210 is formed at the bottom. The opening 131 is covered by a bottom plate 140 overlapping the second case 130 on the other side −Z in the Z-axis direction, and the flexible wiring boards 71, 72 drawn from the opening 131 are drawn to the outside from in between the second case 130 and the bottom plate 140.

Further, as illustrated in FIG. 5 and the like, in the fixed body 10, a rectangular frame shaped stopper member 150 defining a movable range to the other side −Z in the Z-axis direction of the movable body 20 is arranged between the first case 110 and the second case 130. The stopper member 150 is held in a state of being caught between the first case 110 and the second case 130, when the first case 110 and the second case 130 are placed on top of each other in the Z direction.

(Configuration of Movable Body 20)

The movable body 20, as illustrated in FIG. 2, FIG. 3 and the like, has an optical module 210 including optical elements such as a lens 211, a holder frame 220 configured to hold the optical module 210, and a filter switching mechanism 230. The optical module 210, as illustrated in FIG. 5, has a lens holder 213 for holding the lens 211, an imaging element (imaging unit) 212, an actuator (not shown) for focusing drive, and the like, and the optical module 210 is held onto the holder frame 220 through the lens holder 213.

The holder frame 220, as illustrated in FIG. 5, configures an outer portion of the movable body 20, and generally has a cylindrical holder holding unit 221 configured to internally hold the lens holder 213, and a thick base unit 222 radially expanding in a flange shape at a lower end (the end of the other side −Z in the Z-axis direction) of the holder holding unit 221. On an outer periphery of the base unit 222, coil holding units 223 configured to respectively hold four coils 42 constituting the shake correction drive mechanism 40, described later, are arranged outward in a radial direction than the holder holding unit 221, and a movable frame arrangement space 240 in which a movable frame 310 of the gimbal mechanism 30 described later is arranged is formed between the coil holding units 223 and the holder holding unit 221. Further, in the coil holding units 223, a protruding unit 224 protruding further outward from the outer surface of the coils 42 (the surface facing the magnets 41) is arranged in a state where the coils 42 are held by the coil holding units 223, and the protruding unit 224 faces the magnets 41. Therefore, when the movable body 20 is displaced in the X-axis direction or the Y-axis direction by an external force, the protruding unit 224 of the coil holding units 223 comes into contact with the magnets 41 to prevent the coils 42 and the magnets 41 from coming into contact with each other. It is noted that in the present embodiment, the holder frame 220 is made of a synthetic resin, and the holder holding unit 221, the base unit 222, and the coil holding units 223 are integrally formed.

Further, the imaging element 212 arranged in the movable body 20, the actuator for focusing drive, and the like are connected to a flexible wiring substrate 71 for signal output (communication). The imaging element 212 is mounted on a mounting board 214 on which electronic components such as a gyroscope and a capacitor are mounted, and the flexible wiring board 71 described earlier is connected to the mounting board 214. It is noted that the flexible wiring board 71 connected to the mounting board 214 has a portion routed to the outside that is divided into two portions. On the other hand, the coils 42 constituting the shake correction drive mechanism 40 is connected to a flexible wiring substrate 72 for power supply. The flexible wiring boards 71 and 72 are electrically connected to an upper-level control unit or the like arranged at the main body side of the optical device.

It is noted that the flexible wiring boards 71, 72, as illustrated in FIG. 5, are wound a plurality of times under the lens holder 213 (the other side −Z in the Z-axis direction), and are then drawn to the outside. As illustrated in FIG. 1, the flexible wiring board 72 connected to the coils 42 is arranged between the two divided portions of the flexible wiring board 71 connected to the optical module 210, and the direction of drawing the two flexible wiring boards 71, 72 to the outside is aligned. Further, both the flexible wiring boards 71 and 72 have flexibility so that the movement of the holder frame 220 and the optical module 210 held by the holder frame 220 is not hindered by the shake correction drive mechanism 40.

(Configuration of Shake Correction Drive Mechanism 40)

The shake correction drive mechanism 40, as illustrated in FIG. 5, FIG. 6 and the like, is a magnetic drive mechanism utilizing plate-like magnets 41, and coils 42 configured to apply an electromagnetic force in the magnetic field of the magnets 41. In the present embodiment, as illustrated in FIG. 2 and FIG. 3, four sets of combinations of magnets 41 and coils 42 are arranged at an interval of 90° in a circumferential direction of the movable body 20 (the holder frame 220). Further, as illustrated in FIG. 5 and FIG. 6, each magnet 41 is held by the first case 110, and each coil 42 is held by the holder frame 220, and in the present embodiment, the shake correction drive mechanism 40 is configured between the first case 110 and the holder frame 220.

The magnets 41 are respectively held on the inner surfaces of each of the four side plate units 111 arranged at an interval of 90° in the circumferential direction of the first case 110. Each side plate unit 111 is arranged on one side +X in the X-axis direction, the other side −X in the X-axis direction, one side +Y in the Y-axis direction, and the other side −Y in the Y-axis direction. Therefore, between the first case 110 and the holder frame 220, the magnets 41 and the coils 42 are opposed to each other in all of the one side +X in the X-axis direction, the other side −X in the X-axis direction, one side +Y in the Y-axis direction, and the other side −Y in the Y-axis direction.

In the present embodiment, the outer surface side and the inner surface side of the four magnets 41 are magnetized to different poles. Further, the magnets 41 are magnetized by being separated into two in the optical axis L direction (Z-axis direction), so that the magnetic poles 411 and 412 located at the coil 42 side (inner surface side) are different in the optical axis L direction (see FIG. 3 and FIG. 5). Therefore, the magnetization polarization line 413 separating both magnetic poles 411 and 412 is arranged along a direction perpendicular to the optical axis L. In the two magnets 41 arranged respectively at the one side +X in the X-axis direction and the other side −X in the X-axis direction, the magnetization polarization line 413 is arranged along the Y-axis direction, and in the two magnets 41 arranged respectively at the one side +Y in the Y-axis direction and the other side −Y in the Y-axis direction, the magnetization polarization line 413 is arranged along the X-axis direction.

It is noted that the four magnets 41 have the same magnetization pattern on the outer surface side and the inner surface side. Thus, the magnets 41 adjacent in the circumferential direction are not attracted to each other, and therefore, it is easy to assemble, for example. Further, the first case 110 is made of a magnetic material, and functions as a yoke for the magnets 41.

The coils 42 are air-core coils having no magnetic core (core), and are held by the holder frame 220 as described earlier. Further, each of the coils 42 is held at the one side +X in the X-axis direction of the holder frame 220, the other side −X in the X-axis direction thereof, one side +Y in the Y-axis direction thereof, and the other side −Y in the Y-axis direction thereof. Among these, both coils 42 arranged on the one side +X in the X-axis direction of the holder frame 220, and the other side −X in the X-axis direction thereof are formed in an annular shape by the windings, with the X-axis direction as the axial center direction of the coil. Further, both coils 42 arranged on the one side +Y in the Y-axis direction, and the other side −Y in the Y-axis direction are formed in an annular shape by the windings, with the Y-axis direction as the axial center direction of the coil. Thus, any of the coils 42 is formed in an annular shape in which a direction perpendicular to the optical axis L direction is the axial center direction of the coil. Further, the four coils 42 are formed with the same planar shape and thickness (height) dimension.

It is noted that of the four coils 42, the two coils 42 in which the X-axis direction is the axial center direction of the coil are formed in a rectangular shape extending in the Y-axis direction. Further, the two coils 42 in which the Y-axis direction is the axial center direction of the coil are formed in a rectangular shape extending in the X-axis direction. In any of the coils 42, upper and lower longer side units are utilized as an effective side to face the magnetic poles 411, 412 of each of the magnets 41, and while the coils 42 are not excited, the both effective sides are placed at vertically equal distances from the magnetization polarization line 413 while running in parallel to the magnetization polarization line 413 of the facing magnets 41.

(Configuration of Gimbal Mechanism 30)

In the optical unit 101 according to the present embodiment, to correct the shake in the pitching direction and the yawing direction, the movable body 20 is oscillatably supported around the first axial line R1 crossing the optical axis L direction, and is also oscillatably supported around the second axial line R2 crossing the optical axis L direction and the first axial line R1. Therefore, a gimbal mechanism (oscillation support mechanism) 30 is configured between the fixed body 10 and the movable body 20.

In the present embodiment, the gimbal mechanism 30 has a rectangular movable frame 310, and the movable frame 310, as illustrated in FIG. 5, FIG. 6 and the like, is arranged in the movable frame arrangement space 240 of the holder frame 220, and between the bottom surface of the cover frame 120 of the fixed body 10 (the surface of the other side −Z in the Z-axis direction) and the holder frame 220 of the movable body 20. In the present embodiment, the movable frame 310 is made of a metallic material having spring characteristics, and as illustrated in FIG. 4, FIG. 6 and the like, is formed in a rectangular shape having four corner units 321 arranged at an interval of 90° in a circumferential direction, and a connecting unit 322 connecting each corner unit 321. Spherical bodies 311 are respectively fixed on the inner side of the four corner units 321 of the movable frame 310. Further, each connecting unit 322 has a meandering shape curved in a direction perpendicular to the extending direction and the Z-axis direction thereof. Therefore, the movable frame 310 has spring characteristics capable of absorbing shocks when an impact is applied from the outside.

On the other hand, on the bottom surface of the cover frame 120 (the surface of the −Z side), as illustrated in FIG. 4, of the four corner units 321 around the optical axis L, groove units 122 configured to open toward the other side −Z in the Z-axis direction are formed respectively at two corner units 321 located diagonally opposite to each other in the direction in which the first axial line R1 extends. Also, a contact spring 330 is attached to each groove unit 122, and as illustrated in FIG. 6, of the four spherical bodies 311 of the movable frame 310, two spherical bodies 311 located diagonally opposite to each other in the direction in which the first axial line R1 extends are respectively supported by the contact springs 330. Further, on the top surface of the base unit 222 of the holder frame 220, as illustrated in FIG. 6, groove units 225 configured to open toward the one side +Z in the Z-axis direction are formed respectively at two corner units 321 located diagonally opposite to each other in the direction in which the second axial line R2 extends. A contact spring 330 is attached to each groove unit 225, and of the four spherical bodies 311 of the movable frame 310, two spherical bodies 311 located diagonally opposite to each other in the direction in which the second axial line R2 extends are respectively supported by the contact springs 330.

Specifically, each contact spring 330 is bent to form a U-shaped vertical cross section by press-forming a plate member made of a metal such as elastically deformable stainless steel, and an elastic load (elastic force) is applied to the contact point with the spherical bodies 311 arranged on the movable frame 310 from a radially inner side to an outer side. That is, each spherical body 311 arranged at the four corner units 321 of the movable frame 310 is elastically brought into contact, from a radially outer side, to each contact spring 330 attached to the cover frame 120 of the fixed body 10 or the holder frame 220 of the movable body 20.

In this case, as illustrated in FIG. 6, the contact springs 330 fixed in the cover frame 120 face each other to form a pair in the direction of the first axial line R1, and configure a first oscillation fulcrum between the spherical bodies 311 of the movable frame 310. On the other hand, the contact springs 330 fixed in the holder frame 220 face each other to form a pair in the direction of the second axial line R2, and configure a second oscillation fulcrum between the spherical bodies 311 of the movable frame 310. Therefore, the oscillation center position (oscillation fulcrum) 35 of the movable body 20 is arranged at the intersection of the first axial line R1 and the second axial line R2 in which the first oscillation fulcrum and the second oscillation fulcrum are combined.

In this way, since each spherical body 311 of the movable frame 310 is oscillatably in contact with the contact springs 330, the holder frame 220 of the movable body 20 is oscillatably supported with respect to the cover frame 120 of the fixed body 10. Further, in the gimbal mechanism 30 thus configured, a biasing force of each of the contact springs 330 is set equally. It is noted that in the present embodiment, a magnetic drive mechanism is used for the shake correction drive mechanism 40, and thus, both the movable frame 310 and the contact spring 330 used for the gimbal mechanism 30 are made from a nonmagnetic material.

Further, in the present embodiment, the movable frame 310 is arranged at the same height position (the same position in the Z-axis direction) as the coil holding units 223. Therefore, as seen from the direction perpendicular to the optical axis L direction, the gimbal mechanism 30 is arranged in a position overlapping with the shake correction drive mechanism 40. In particular, in the present embodiment, as illustrated in FIG. 5, as seen from the direction perpendicular to the optical axis L direction, the gimbal mechanism 30 is arranged at a position overlapping with the center position in the Z-axis direction of the shake correction drive mechanism 40. More specifically, in a non-excited state of the shake correction drive mechanism 40, the gimbal mechanism 30 is arranged at the same height position as the magnetization polarization line 413 of the magnets 41 in the Z-axis direction. Therefore, the first oscillation fulcrum and the second oscillation fulcrum of the gimbal mechanism 30 are arranged at positions overlapping with the center position of the shake correction drive mechanism 40 in the Z-axis direction, and the oscillation center position 35 of the movable body 20 is also arranged at a position overlapping with the center position of the shake correction drive mechanism 40.

It is noted that between the cover frame 120 of the fixed body 10 and the holder frame 220 of the movable body 20, a leaf spring 510 connected to both of the cover frame 120 and the holder frame 220, and defining an attitude of the movable body 20 when the shake correction drive mechanism 40 is in a stopped state is arranged. The leaf spring 510 is a spring member formed by processing a metal plate into a predetermined shape, and as illustrated in FIG. 2, has a fixed body-side connecting unit 511 constituting an outer peripheral portion thereof, a ring-shaped movable body-side connecting unit 512 constituting an inner peripheral portion, and a leaf spring-like arm unit 513 connecting the fixed body-side connecting unit 511 and the movable body-side connecting unit 512.

The fixed body-side connecting unit 511 is positioned by four convex units 125 formed on the cover frame 120 in a state of being overlapped with the bottom surface of the cover frame 120 of the fixed body 10 (the surface of the other side −Z in the Z-axis direction), and is fixed by adhesion or the like. Moreover, although not shown, the movable body-side connecting unit 512 is positioned by four projecting units 226 formed on the holder holding unit 221 of the holder frame 220 of the movable body 20, and is fixed by adhesion or the like.

(Configuration of Filter Switching Mechanism 230)

The filter switching mechanism 230 is configured by an electronic filter mechanism including an electronic filter (filter) 231 using a liquid crystal. The electronic filter 231 according to the present embodiment is, for example, a variable filter (ND filter) capable of adjusting the transmittance of light by changing a drive voltage to be applied. Therefore, the filter switching mechanism 230 does not have a mechanical drive mechanism, and can electronically switch the transmission amount (gradation) of the light, that is, the presence or absence of the filter according to the present invention.

In the optical unit 101 according to the present embodiment, the filter switching mechanism 230 is fixed to an upper end portion of the lens holder 213 of the movable body 20, and the electronic filter 231 is arranged closer to the subject (the other side +Z in the Z-axis direction) than the lens (optical element) 211. Further, the electronic filter 231 and the filter switching mechanism 230 are arranged on the opposite side to the side of the imaging element (imaging unit) 212 of the optical module 210 with respect to the oscillation center position (oscillation fulcrum) 35 of the movable body 20 in the Z-axis direction. It is noted that although not shown, the electronic filter 231 is connected to the flexible wiring board 72 for power supply to which the coils 42 are connected, and an appropriate drive voltage can be applied via the flexible wiring board 72.

In the optical module 210, the mounting board 214 and the like is arranged on the side of the imaging element 212, and the position of the center of gravity of the movable body 20 excluding the filter switching mechanism 230 is on the side of the imaging element 212 (the other side −Z in the Z-axis direction) from the oscillation center position (oscillation fulcrum) 35 of the movable body 20. Therefore, by arranging the filter switching mechanism 230 at the subject side of the optical module 210, the position of the center of gravity of the movable body 20 can be set either to the same position or brought closer to the oscillation center position 35 by using the filter switching mechanism 230. It is noted that in addition to the filter switching mechanism 230, it is also possible to adjust the position of the center of gravity of the movable body 20 by further using a weight (member for adjusting the position of the center of gravity).

(Operation and Effect)

In the optical unit 101 with a shake correction function configured as described above, the shake can be corrected with respect to the pitching and yawing by making the movable body 20 oscillate around the first axial line R1 or the second axial line R2 with the help of the gimbal mechanism (oscillation support mechanism) 30 and the shake correction drive mechanism 40. Further, since the optical unit 101 has the filter switching mechanism 230, it is possible to capture images with a desired amount of light by selecting the presence or absence of a filter, that is, in this case, by modulating the transmittance of light of the electronic filter 231, while having an effect of shake correction.

Further, in the optical unit 101, since the position of the center of gravity of the movable body 20 and the oscillation center position 35 can be set either to the same position or brought closer to each other without using a separate member configured to adjust the center of gravity, the increase in the weight of the movable body 20 can be suppressed, and the torque required for oscillation can thus be suppressed as compared to a case in which both the filter switching mechanism 230 and a member of adjusting the position of the center of gravity are present. Therefore, it is possible to reduce the power consumption during the oscillation of the movable body 20.

Further, in the optical unit 101 according to the present embodiment, since the filter switching mechanism 230 does not have a drive mechanism, the optical unit 101 is comparatively small and lightweight, the adjustment of the position of the center of gravity of the movable body 20 can be made easily, and the movable body 20 itself can be configured to be comparatively smaller and lighter. In addition, since no vibration is caused in the movable body 20 at the time of switching of the filter, the shake can be corrected with high accuracy without hindering the oscillation of the movable body 20 at the time of shake correction.

OTHER EMBODIMENTS

Figure 7:
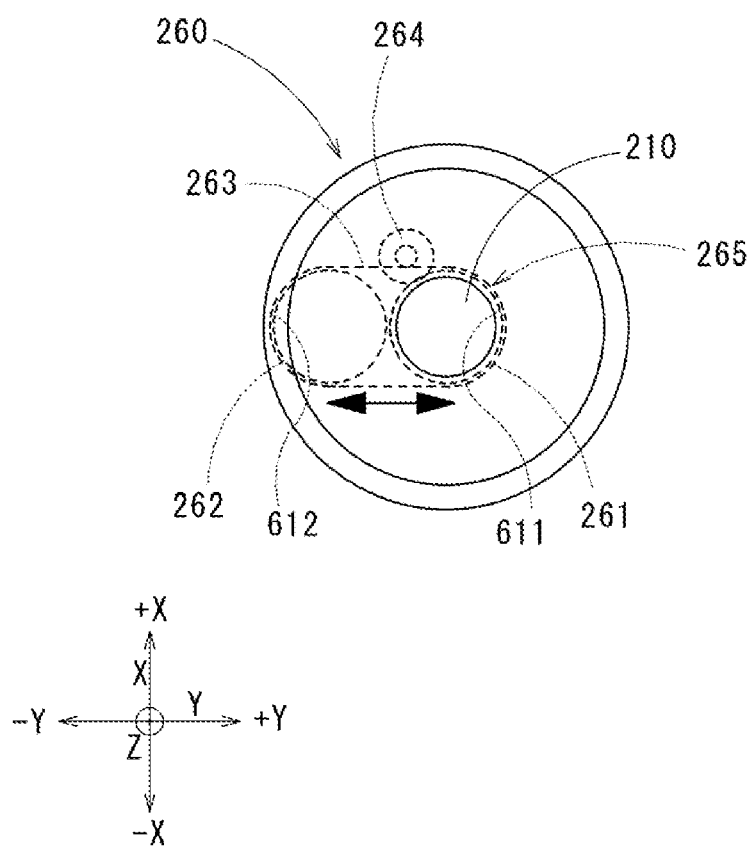
FIG. 7 is a front view of an optical unit with a shake correction function according to a second embodiment of the present invention as seen from a +Z side, and illustrates a modification of a filter switching mechanism.

FIG. 7 is a front view schematically illustrating the movable body portion of the optical unit according to a second embodiment of the present invention, and is an explanatory view mainly illustrating the filter switching mechanism 260. Since the basic configuration of the second embodiment and a third embodiment described later is same as that of the first embodiment, the corresponding parts are denoted by the same reference numerals and the description thereof is omitted.

In the optical unit 101 according to the first embodiment illustrated in FIG. 1 and the like, the filter switching mechanism 230 was configured by the electronic filter mechanism including the electronically controllable electronic filter (the so-called ND filter) 231, but in the second embodiment, as illustrated in the schematic view in FIG. 7, a filter switching mechanism 260 capable of switching the presence or absence of the filter 261 is configured by a mechanical drive mechanism. More specifically, in the filter switching mechanism 260 illustrated in FIG. 7, for example, the filter 261 is configured by an infrared cut filter (IR filter), and a slide drive mechanism 265 configured to move the filter 261 forward and backward in a direction perpendicular to the optical axis L direction, and enables the filter 261 to be extracted and inserted with respect to an optical path is present.

As illustrated in FIG. 7, the slide drive mechanism 265 includes a filter holder 263 configured to hold the filter 261, and an actuator 264 configured to move the filter holder 263 forward and backward with respect to the optical path. For example, by using a motor having a rotating shaft for the actuator 264, the slide drive mechanism 265 can be configured by a rack and pinion mechanism or the like configured to convert a rotational motion of the motor into linear motion. In FIG. 7, the filter holder 263 has two openings 611, 612, and while the filter 261 is fixed to one opening 611, a dummy filter 262 is fixed to the other opening 612. The actuator 264, as described earlier, is configured by a motor or the like having, for example, a rotating shaft, and in FIG. 7, by performing reverse rotation of the actuator 264 (left rotation in FIG. 7, counterclockwise rotation) in a state when the filter 261 is arranged in the optical path of the optical module 210, the filter 261 can be retracted from the optical path, and the dummy filter 262 can be arranged on the optical path. Further, by performing normal rotation of the actuator 264 (right rotation in FIG. 7, clockwise rotation) in a state when the filter 261 has been retracted from the optical path, the dummy filter 262 can be retracted from the optical path and the filter 261 can be made to enter the optical path.

It is noted that a filter that is a combination of an infrared cut filter and an anti-reflection filter, or various filters such as an anti-reflection filter, an ND filter, a polarizing filter, or the like may be used as the filter 261. Also, a simple glass plate (cover glass) configured to protect the optical module 210, or same as the filter 261, another filter such as an anti-reflection filter or the like can be used as the dummy filter 262, and by mounting two filters having different functions on the openings 611, 612 of the filter holder 263, the two filters may be switched.

In the present embodiment, although not shown, the filter switching mechanism 260 is fixed to the holder holding unit 221, and is arranged at the subject side of the optical module 210. Of these, the filter holder 263 having the relatively lightweight filter 261 is arranged closer to the subject than the optical module 210. The actuator 264 having a larger weight than the filter holder 263 is arranged closer to the imaging element 212 than the filter holder 263, but is arranged closer to the subject than the oscillation center position 35 of the movable body 20. In this way, by arranging the actuator 264 closer to the subject than the oscillation center position 35, the position of the center of gravity of the movable body 20 can be set either to the same position or brought closer to the oscillation center position 35.

Further, if the angle of view of the optical module 210 is large (in the case of a wide angle), although not shown, the filter switching mechanism 260 has a shape slightly larger than the lens at the subject side. That is, the diameter of the relatively lightweight filter 261 becomes equal to or larger than the angle of view, and the filter holder 263 is arranged closer to the subject than the optical module 210. Further, the actuator 264 having a larger weight than the filter holder 263 is arranged on the outer peripheral side (radially outer side) than the holder frame 220. As a result, it is possible to switch the filter 261 without narrowing the angle of view. Further, by arranging the actuator 264 closer to the subject than the oscillation center position 35 of the movable body 20, the position of the center of gravity of the movable body 20 can be set either to the same position or brought closer to the oscillation center position 35.

In the second embodiment too, since the filter switching mechanism 260 is provided, the presence or absence of the filter 261 can be selected, that is, in this case, the presence or absence of the infrared cut filter can be selected, while having an effect of shake correction. In a case that infrared rays equal to or more than a predetermined amount are made to enter the imaging element (imaging unit) 212 in a bright place, the filter 261 can be inserted in the optical path to reduce the entry of the infrared rays, and thus a quantity of light having an appropriate wavelength can be input to the imaging element 212. On the other hand, in a dark place, the infrared rays can be made to enter the imaging element 212 by removing and retracting the filter 261 from the optical path. Therefore, in the second embodiment, by switching the presence or absence of the filter 261, it is possible to capture clear images at not only bright places but also dark places, and day and night photography can be performed.

Further, in the second embodiment too, since the position of the center of gravity of the movable body 20 and the oscillation center position 35 can be set either to the same position or brought closer to each other by using the filter switching mechanism 260 itself, an increase in the weight of the movable body 20 can be suppressed, and thus, the torque required for oscillation can be suppressed. Therefore, it is possible to reduce the power consumption during the oscillation of the movable body 20.

Figure 8:
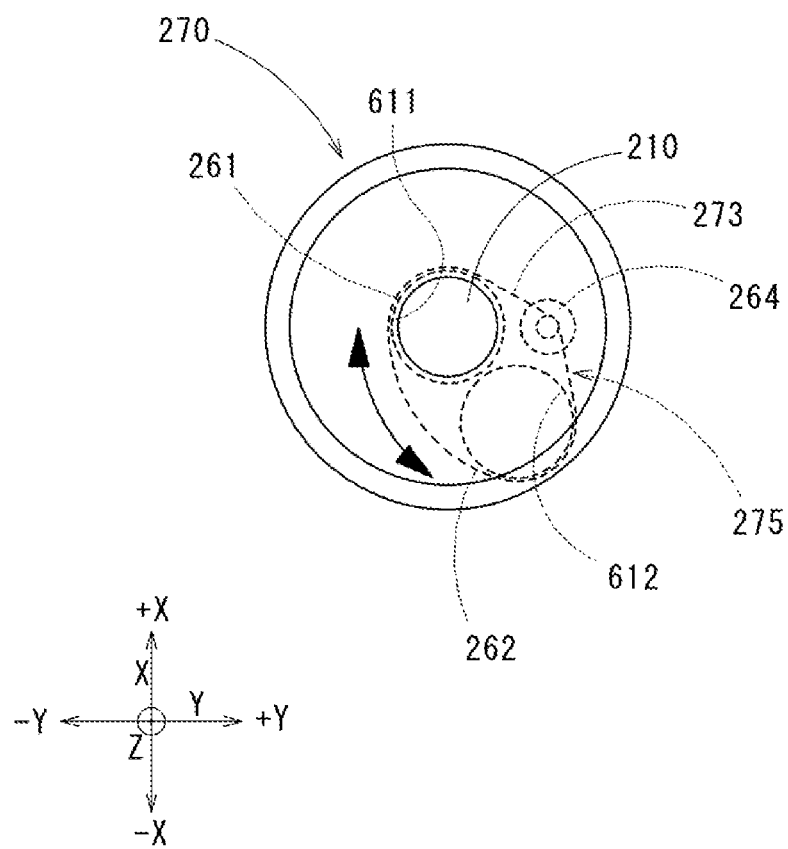
FIG. 8 is a front view of an optical unit with a shake correction function according to a third embodiment of the present invention as seen from a +Z side, and illustrates a modification of the filter switching mechanism.

It is noted that in the second embodiment, the filter switching mechanism 260 was configured by the slide drive mechanism 265 configured to move the filter 261 forward and backward, but similar to the filter switching mechanism 270 of the third embodiment illustrated in FIG. 8, the filter switching mechanism can also be configured by the rotation drive mechanism 275 configured to rotationally move the filter 261.

For example, in the filter switching mechanism 270 illustrated in FIG. 8, a motor having a rotating shaft is used as the actuator 264, and the filter holder 273 is directly rotated around the rotating shaft by using the rotational motion of the motor. As a result, the filter 261 is moved rotationally (in an arcuated manner) in a direction perpendicular to the optical axis L direction so that the filter 261 can be extracted and inserted with respect to the optical path of the optical module 210. In this case too, similar to the second embodiment, the filter switching mechanism 270 is fixed to the holder holding unit 221, and is arranged at the subject side of the optical module 210. Also, the filter holder 273 having the relatively lightweight filter 261 arranged closer to the subject than the optical module 210. Further, the actuator 264 having a larger weight than the filter holder 273 is arranged closer to the imaging element 212 than the filter holder 273, but is arranged closer to the subject than the oscillation center position 35 of the movable body 20. In this way, in the third embodiment too, by arranging the actuator 264 closer to the subject than the oscillation center position 35, the position of the center of gravity of the movable body 20 can be set either to the same position or brought closer to the oscillation center position 35.

In the third embodiment too, since the filter switching mechanism 270 is provided, the presence or absence of the filter 261 can be selected while having an effect of shake correction. Therefore, by switching the presence or absence of the filter 261, it is possible to capture clear images at not only bright places but also dark places, and day and night photography can be performed. Further, since the position of the center of gravity of the movable body 20 and the oscillation center position 35 can be set either to the same position or brought closer to each other by using the filter switching mechanism 270 itself, an increase in the weight of the movable body 20 can be suppressed, and thus, the torque required for oscillation can be suppressed. Therefore, it is possible to reduce the power consumption during the oscillation of the movable body 20.

In the second embodiment and the third embodiment, the filter switching mechanisms 260, 270 configured to switch between two filters having different functions were configured, but the configuration of the filter switching mechanism is not limited thereto. For example, the configuration may be such that the presence or absence of the filter is switched by enabling the extraction and insertion of one filter with respect to the optical path of the optical module 210.

In addition, the present invention is not limited to the above embodiment, and it is possible to apply various modifications without departing from the spirit of the present invention. Further, the gimbal mechanism 30 adopts a structure where the spherical bodies 311 fixed to the movable frame 310 are brought into contact with the contact spring 330, however the spherical bodies 331 may not necessarily be needed, and it is possible to adopt a structure where a spherical front end face formed by spherically shaping the front end face of a rod-shaped member or the like is brought into contact with the contact spring 330.

Further, in the present embodiment, an optical unit having the correction function of pitching and yawing was described, however, a structure having a correction function for rolling, in addition to pitching and yawing, may be adopted.

What is claimed is:

1. An optical unit with a shake correction function, comprising:
    a fixed body;
    a movable body, having an optical element;
    an oscillation support mechanism, configured to oscillatably support the movable body with respect to the fixed body; and
    a shake correction drive mechanism, configured to oscillate the movable body, wherein
        the movable body has a filter and a filter switching mechanism configured to switch the presence or absence of the filter,
        the oscillation support mechanism is arranged at a position overlapping the shake correction drive mechanism when seen from a direction perpendicular to a direction of an optical axis of the optical element, and
        the filter and the filter switching mechanism are arranged at a subject side of the optical element.

2. The optical unit with a shake correction function according to claim 1, wherein
    the filter and the filter switching mechanism are arranged at a side opposite to the imaging unit side of the optical element with respect to an oscillation center position of the movable body.

3. The optical unit with a shake correction function according to claim 1, wherein
    the shake correction drive mechanism is a magnetic drive mechanism having magnets, and coils configured to apply an electromagnetic force in a magnetic field of the magnets, and
    the magnets are arranged on the fixed body, and the coils are arranged on the movable body.

4. The optical unit with a shake correction function according to claim 1, wherein
    the movable body has a flexible wiring board connected to the shake correction drive mechanism, the imaging unit, and the filter switching mechanism.

5. The optical unit with a shake correction function according to claim 1, wherein
    the movable body has a member configured to adjust the position of the center of gravity.

6. The optical unit with a shake correction function according to claim 1, wherein
    the filter is an infrared cut filter.

7. The optical unit with a shake correction function according to claim 2, wherein
    the shake correction drive mechanism is a magnetic drive mechanism having magnets, and coils configured to apply an electromagnetic force in a magnetic field of the magnets, and
    the magnets are arranged on the fixed body, and the coils are arranged on the movable body.

8. The optical unit with a shake correction function according to claim 7, wherein
    the movable body has a flexible wiring board connected to the shake correction drive mechanism, the imaging unit, and the filter switching mechanism.

9. The optical unit with a shake correction function according to claim 8, wherein
    the movable body has a member configured to adjust the position of the center of gravity.

10. The optical unit with a shake correction function according to claim 9, wherein
    the filter is an infrared cut filter.

* * * * *